United States Patent Office 3,277,115
Patented Oct. 4, 1966

3,277,115
THIOPHOSPHONATES CONTAINING AN S-ACYL-METHYLMERCAPTO A L K Y L ESTERIFYING MOIETY
Karoly Szabo, Pleasantville, N.Y., and John G. Brady, Campbell, Calif., assignors to Stauffer Chemical Company, New York, N.Y., a corporation of Delaware
No Drawing. Filed Apr. 16, 1963, Ser. No. 273,301
17 Claims. (Cl. 260—326.5)

This invention pertains to organophosphorus compounds and in particular to thiophosphonates containing an S-alkyl ester grouping having affixed thereto an acyl methyl mercapto moiety. The invention also pertains to a method of preparing the compounds and to their use as the active component in the manufacture of pesticidal compositions.

Compounds of the present invention can be depicted by the following general formula:

$$R-\overset{X}{\underset{OR_1}{\overset{\|}{P}}}-S-(CH_2)_n-S-CH_2-\overset{O}{\overset{\|}{C}}-Q$$

wherein R is selected from the class consisting of lower alkyl radicals and chlorinated lower alkyl radicals, $R_1$ represents a lower alkyl radical, X is a chalcogen selected from the class consisting of oxygen and sulfur, Q is a member selected from the group designated by the formulae:

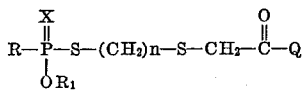   and   $-OR_4$ in which $R_2$ represents hydrogen, lower alkyl radicals, chlorinated lower alkyl radicals, $R_3$ can be hydrogen, a lower alkyl radical, a phenyl radical and its halogenated derivatives, it being understood that when one of said $R_2$ and $R_3$ is a phenyl radical, the other is a non-phenyl substituent, or when taken together $R_2$ and $R_3$ constitutes a heterocyclic ring system as typified by the pyrrolidine series, the piperidine series, the morpholine series, and the like; $R_4$ signifies a lower aliphatic radical, e.g. methyl, ethyl, n-propyl, tert.-butyl, sec.-butyl, allyl, meth.-allyl, propargyl, etc. or a phenyl radical, substituted or not, and $n$ is an integer of from 1 to 2. In preparing the organophosphorus toxicants of the invention, it has been ascertained that they are realizable by a general synthetic procedure in which an organic thiophosphonate carrying a terminal chlorine substituent on the S-alkyl ester moiety is reacted with a mercaptomethyl acylated component in the presence of a base. The course of the reaction is schematically portrayed as shown in the following chemical equation:

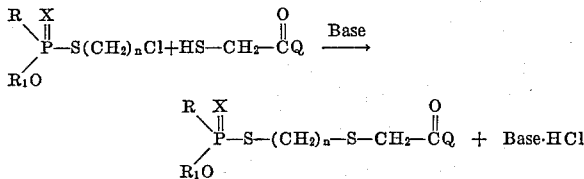

wherein R, $R_1$, X, Q and $n$ have the significance as previously set forth. As can be seen from the chemical equation, the function of the base is to form a sodium salt of the mercaptomethyl acyl reactant and this is the actual entity which undergoes condensation with the organophosphorus intermediate.

Any basic substance can be utilized which is sufficiently strong to form the salt of the mercaptomethyl reactant and in this connection reference is made to strong organic tertiary bases, e.g. lower trialkyl amines, i.e. triethylamine, pyridine, n-ethyl morpholine, alkali metal alkoxides, hydroxides, carbonates, e.g. sodium ethoxide, potassium ethoxide, sodium carbonate, sodium hydroxide, and the like. The reaction is conveniently carried out by refluxing the aforenamed reactants in the presence of a normally liquid, relatively inert organic solvent and for this purpose the liquid aliphatic and aromatic hydrocarbons as well as their liquid chlorinated derivatives have proven especially suitable. However, other liquid media can also be resorted to and the general reaction is not limited to any particular solvent system.

Reference is now made to the following examples which are presented for illustrative purposes only since variations in practicing the invention without departing from the scope or spirit thereof will be apparent to those skilled in the art to which the said invention pertains.

Example 1.—O-ethyl-S-[N-methyl-(carbamoyl-methylthiomethyl)]-ethylphosphonodithioate

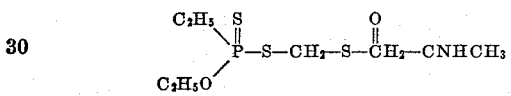

10.9 g. (0.05 M) of S-chloromethyl-O-ethyl ethylphosphonodithioate and an equivalent quantity of 2-mercapto-N-methylacetamide were added to 80 ml. of absolute alcohol which had previously been reacted with 1.13 g. (0.05 M) of sodium. The mixture was refluxed for 4 hours after which interval the precipitated salt was filtered off and the filtrate washed with 6% sodium bicarbonate followed by a water wash. The organic fraction was dried over anhydrous magnesium sulfate and distilled in vacuo to remove the solvent and volatile components. There was obtained 11 g. of a residual, slightly viscous, pale yellow oil having an $N_D^{25}$ of 1.5600. The chemical and instrumental analysis of the product was in consonance with the above depicted structure.

Using the procedure as set forth in the first example, the following additional compounds were prepared. In general, the results and yields paralleled those obtained in Example 1.

It is to be understood that the term "thiophosphonic acid" and "thiophosphonate" as used herein is a generic expression and includes both thiophosphonic and dithiophosphonic acids and their esters.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

| Example No. | Description |
|---|---|
| 2. O-ethyl-S-(carboethoxymethylthiomethyl)-ethylphosphonodithioate: $$\begin{array}{c} C_2H_5 \quad S \\ \diagdown \quad \parallel \\ \quad P-S-CH_2-S-CH_2-\overset{O}{\overset{\parallel}{C}}OC_2H_5 \\ \diagup \\ C_2H_5O \end{array}$$ | Yellow oil; $N_D^{25}$=1.5337. |
| 3. O-methyl-S-(carboethoxymethylthiomethyl) ethylphosphonodithioate: $$\begin{array}{c} C_2H_5 \quad S \\ \diagdown \quad \parallel \\ \quad P-S-CH_2-S-CH_2-\overset{O}{\overset{\parallel}{C}}OC_2H_5 \\ \diagup \\ CH_3O \end{array}$$ | Straw yellow oil; $N_D^{25}$=1.5450. |
| 4. O-isopropyl-S-(carboethoxymethylthiomethyl)-ethylphosphonodithioate: $$\begin{array}{c} C_2H_5 \quad S \\ CH_3 \quad \diagdown \quad \parallel \\ \diagdown \quad P-S-CH_2-S-CH_2-\overset{O}{\overset{\parallel}{C}}OC_2H_5 \\ CHO \diagup \\ \diagup \\ CH_3 \end{array}$$ | Light yellow oil; $N_D^{25}$=1.5288. |
| 5. S-(O-ethyl-ethylphosphonodithioyl)-3-thioethyl valerate: $$\begin{array}{c} C_2H_5 \quad S \\ \diagdown \quad \parallel \\ \quad P-S-CH_2CH_2-S-CH_2-\overset{O}{\overset{\parallel}{C}}OC_2H_5 \\ \diagup \\ C_2H_5O \end{array}$$ | Straw yellow oil; $N_D^{25}$=1.5407. |
| 6. O-methyl-S-[N-methylcarbamoyl-(methylthiomethyl)]-ethylphosphonodithioate: $$\begin{array}{c} C_2H_5 \quad S \\ \diagdown \quad \parallel \\ \quad P-S-CH_2-S-CH_2-\overset{O}{\overset{\parallel}{C}}NHCH_3 \\ \diagup \\ CH_3O \end{array}$$ | Yellow oil; $N_D^{25}$=1.5710. |
| 7. O-isopropyl-S-[N-methylcarbamoylmethylthiomethyl]-ethylphosphonodithioate: $$\begin{array}{c} C_2H_5 \quad S \\ CH_3 \quad \diagdown \quad \parallel \\ \diagdown \quad P-S-CH_2-S-CH_2-\overset{O}{\overset{\parallel}{C}}NHCH_3 \\ CHO \diagup \\ \diagup \\ CH_3 \end{array}$$ | Yellow oil; $N_D^{25}$=1.5546. |
| 8. N-methyl-5-[O-ethyl-ethylphosphonodithioyl]-3-thiovaleramide: $$\begin{array}{c} C_2H_5 \quad S \\ \diagdown \quad \parallel \\ \quad P-S-CH_2CH_2-S-CH_2-\overset{O}{\overset{\parallel}{C}}NHCH_3 \\ \diagup \\ C_2H_5O \end{array}$$ | Yellow oil; $N_D^{25}$=1.5668. |
| 9. N,N-dimethyl-5-[O-ethyl-ethylphosphonodithioyl]-3-thiovaleramide: $$\begin{array}{c} C_2H_5 \quad S \quad\quad\quad\quad\quad O \quad CH_3 \\ \diagdown \quad \parallel \quad\quad\quad\quad\quad \parallel \diagup \\ \quad P-S-CH_2CH_2-S-CH_2-CN \\ \diagup \quad\quad\quad\quad\quad\quad\quad\quad\quad \diagdown \\ C_2H_5O \quad\quad\quad\quad\quad\quad\quad\quad\quad CH_3 \end{array}$$ | Yellow oil; $N_D^{25}$=1.5545. |
| 10. O-methyl-S-[N-isopropylcarbamoylmethylthiomethyl]-ethyl: $$\begin{array}{c} C_2H_5 \quad S \quad\quad\quad\quad O \quad\quad CH_3 \\ \diagdown \quad \parallel \quad\quad\quad\quad \parallel \quad\quad \diagup \\ \quad P-S-CH_2-S-CH_2-C-NH-CH \\ \diagup \quad\quad\quad\quad\quad\quad\quad\quad\quad\quad\quad \diagdown \\ CH_3O \quad\quad\quad\quad\quad\quad\quad\quad\quad\quad CH_3 \end{array}$$ | $N_D^{25}$=1.5430. |
| 11. O-methyl-S[N-tetramethylenecarbamoylmethylthiomethyl]-ethylphosphonodithioate: $$\begin{array}{c} C_2H_5 \quad S \quad\quad\quad\quad O \quad CH_2-CH_2 \\ \diagdown \quad \parallel \quad\quad\quad\quad \parallel \diagup \quad\quad\quad\quad \mid \\ \quad P-S-CH_2-S-CH_2-CN \\ \diagup \quad\quad\quad\quad\quad\quad\quad\quad\quad \diagdown \\ CH_3O \quad\quad\quad\quad\quad\quad\quad\quad\quad CH_2-CH_2 \end{array}$$ In this preparation, the reaction was carried out in the presence of a pyrrolidine as a base. | Light brown oil; $N_D^{25}$=1.5522. |
| 12. O-methyl-S-[N-phenylcarbamoylmethylthiomethyl]-ethylphosphonodithioate: $$\begin{array}{c} C_2H_5 \quad S \\ \diagdown \quad \parallel \\ \quad P-S-CH_2-S-CH_2-\overset{O}{\overset{\parallel}{C}}NH-\phi \\ \diagup \\ CH_3O \end{array}$$ | Light yellow oil; $N_D^{25}$=1.5720. |

| Example No. | Description |
|---|---|
| 13. N-methyl-4-(O-ethyl-chloromethylphosphonodithioyl)-3-thiobutyramide:<br><br>$$\begin{array}{c}ClCH_2\\ \diagdown\\ C_2H_5O\end{array}\!\!\!\!\!\overset{S}{\underset{\parallel}{P}}\!\!-\!S\!-\!CH_2\!-\!S\!-\!CH_2\!-\!\overset{O}{\underset{\parallel}{C}}NHCH_3$$ | Yellow oil;<br>$N_D^{25}=1.5650$. |
| 14. Phenyl-(O-ethyl-methylphosphonothioyl)-3-thiobutyrate:<br><br>$$\begin{array}{c}CH_3\\ \diagdown\\ C_2H_5O\end{array}\!\!\!\!\!\overset{O}{\underset{\parallel}{P}}\!\!-\!S\!-\!CH_2\!-\!S\!-\!CH_2\!-\!\overset{O}{\underset{\parallel}{C}}\!-\!O\!-\!\bigcirc$$ | |
| 15. O-ethyl-S-[carbomethoxymethylthiomethyl]-ethylphosphonothioate:<br><br>$$\begin{array}{c}C_2H_5\\ \diagdown\\ C_2H_5O\end{array}\!\!\!\!\!\overset{O}{\underset{\parallel}{P}}\!\!-\!S\!-\!CH_2\!-\!S\!-\!CH_2\!-\!\overset{O}{\underset{\parallel}{C}}OCH_3$$ | Straw yellow oil;<br>$N_D^{25}=1.5107$. |
| 16. O-ethyl-(N-isopropylcarbamoylmethylthiomethyl)-ethylphosphonothioate:<br><br>$$\begin{array}{c}C_2H_5O\\ \diagdown\\ C_2H_5\end{array}\!\!\!\!\!\overset{O}{\underset{\parallel}{P}}\!\!-\!S\!-\!CH_2\!-\!S\!-\!CH_2\!-\!\overset{O}{\underset{\parallel}{C}}\!-\!NH\!-\!CH\!\!\begin{array}{c}\diagup CH_3\\ \diagdown CH_3\end{array}$$ | Yellow oil; $N_D^{25}=$<br>1.5250. |

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activators, fertilizers and the like.

The preparation of pesticidal compositions incorporating the organophosphorus esters of this invention and the results of testing such compositions are spelled out in the following test procedures:

*Acaricidal evaluation test.*—The two-spotted mite, *Tetranychus telarius* (Linn.) is employed in tests for acaricides. Young Pinto bean plants are infested with several hundred mites. Dispersions of test compounds are prepared by dissolving 0.1 gram of the toxic material in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on the table below.

*Systemic toxicity evaluation against two-spotted mites.*—Pinto bean plants in the primary leaf stage are placed in 250 ml. capacity Erlenmeyer flasks, one plant per flask. A portion of the test compound is dissolved in 10 ml. of acetone. This solution is diluted with distilled water in an amount sufficient to give concentrations of active ingredient ranging from 100 parts per million (p.p.m.) to 1 part per million. The final volume of test dispersion per flask is 200 ml. The treated plants are infested with several hundred two-spotted mites, *Tetranychus telarius* (Linn.). After seven and fourteen days, the plants are examined for post-embryonic forms of the mites as well as eggs. The percentage of kill is determined by comparison with control plants which have been placed in distilled water only. The results are reported in the table under "2 SM Systemic."

*Insecticidal evaluation tests.*—Four insect species are subjected to evaluation tests for insecticides:

(1) American cockroach (AR) *Periplaneta americana* (Linn.)
(2) Milkweed bug (MWB) *Oncopeltus fasciatus* (Dallas)
(3) Confused flour beetle (CFB) *Tribolium confusum* (Duval)
(4) House fly (HF) *Musca domestica* (Linn.)

The procedure for insects is similar to the miticidal testing procedure. Test insects are caged in cardboard mailing tubes 3⅛″ in diameter and 2⅝″ tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well known procedures.

Data from testing the compounds of the invention are reported in the table below; the concentration of toxicant is indicated as parts per million or as percent; μg. refers to micrograms and represents the quantity of toxicant received by a single pest organism.

TABLE

| Example | HF, μg. | AR, percent | MWB, percent | 2 SM | | | SMC, percent |
|---|---|---|---|---|---|---|---|
| | | | | PE, percent | E, percent | Syst., p.p.m. | |
| 1 | 30 | .03 | .08 | .0002 | .001 | 0.1 | .005 |
| 2 | 30 | | | .08 | .1 | | |
| 3 | 30 | | | .03 | >.1 | | |
| 4 | 30 | | | .01 | .1 | | |
| 6 | 10 | .05 | .01 | .001 | .03 | .5 | |
| 5 | | | | <.1 | >.1 | | |
| 7 | | .03 | .01 | .0003 | .005 | .5 | |
| 8 | | | | .003 | .03 | <1.0 | |
| 9 | | | | .008 | .03 | 1.0 | |
| 10 | | | | .03 | .1 | | |
| 12 | | | | .03 | .03 | | |
| 13 | | | | .03 | .03 | 5.0 | |

We claim:
1. An organophosphorus compound of the formula:

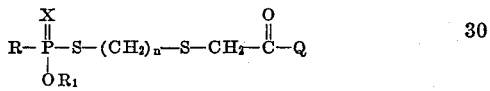

wherein R is selected from the class consisting of lower alkyl and chloro lower alkyl, $R_1$ represents lower alkyl, X is a chalcogen selected from the class consisting of oxygen and sulfur, Q is a member selected from the group designated by the formulae

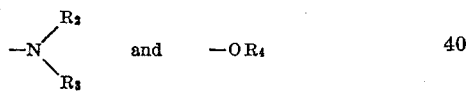

wherein $R_2$ is selected from the class consisting of hydrogen and lower alkyl, $R_3$ is selected from the class consisting of hydrogen, lower alkyl, phenyl, chlorophenyl, it being understood that when one of said $R_2$ and $R_3$ is phenyl, the other is a non-phenyl substituent, and taken together $R_2$ and $R_3$ can complete a heterocyclic ring selected from the group consisting of pyrrolidine, piperidine and morpholine, $R_4$ is selected from the class consisting of lower aliphatic and phenyl, and $n$ represents an integer from 1 to 2.

2. An organophosphorus compound of the formula:

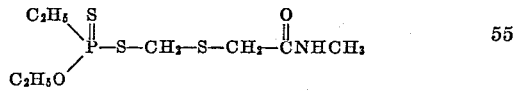

3. An organophosphorus compound of the formula:

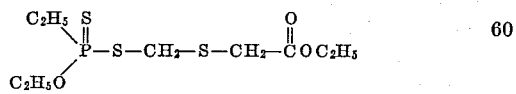

4. An organophosphorus compound of the formula:

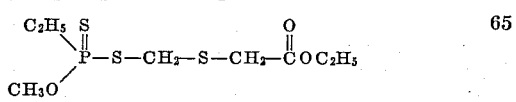

5. An organophosphorus compound of the formula:

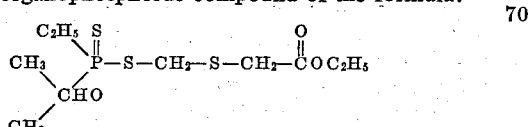

6. An organophosphorus compound of the formula:

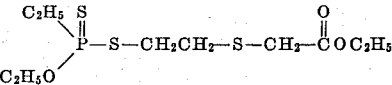

7. An organophosphorus compound of the formula:

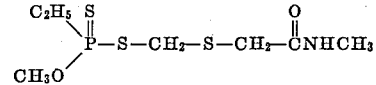

8. An organophosphorus compound of the formula:

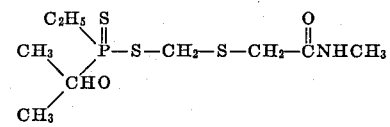

9. An organophosphorus compound of the formula:

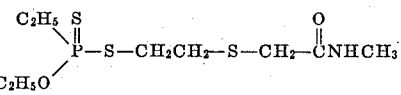

10. An organophosphorus compound of the formula:

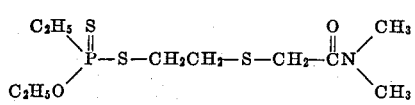

11. An organophosphorus compound of the formula:

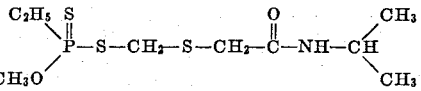

12. An organophosphorus compound of the formula:

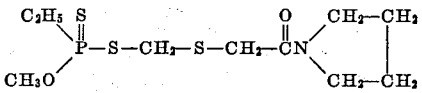

13. An organophosphorus compound of the formula:

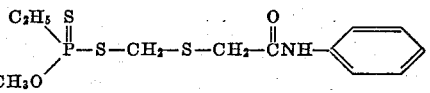

14. An organophosphorus compound of the formula:

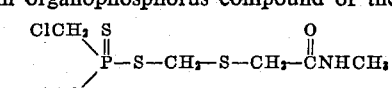

15. An organophosphorus compound of the formula:

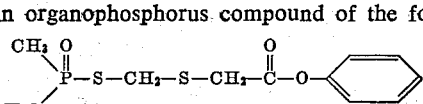

16. An organophosphorus compound of the formula:

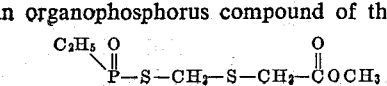

17. An organophosphorus compound of the formula:

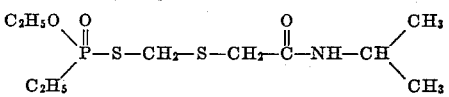

References Cited by the Examiner

UNITED STATES PATENTS

| | | | |
|---|---|---|---|
| 2,861,023 | 11/1958 | Scott et al. | 167—22 |
| 2,881,201 | 4/1959 | Schrader | 260—461 |
| 2,881,202 | 4/1959 | Pianfetti et al. | 260—461 |
| 2,943,974 | 7/1960 | Metivier | 260—461.112 |
| 2,961,458 | 11/1960 | Schegk et al. | 260—461.110 |
| 3,021,351 | 2/1962 | Schegk et al. | 260—461.110 |
| 3,086,974 | 4/1963 | Schlor et al. | 260—461.110 |
| 3,090,719 | 5/1963 | Pinamonti | 167—22 |
| 3,094,405 | 6/1963 | Fon Toy et al. | 71—2.3 |
| 3,094,550 | 6/1963 | Schlor et al. | 260—461.110 |

OTHER REFERENCES

Kabachnik "Zhur. Obshchel Khim," vol. 28, pp. 1568–1573 (1958) et al.

CHARLES B. PARKER, *Primary Examiner*.

JULIAN S. LEVITT, GEORGE A. MENTIS, FRANK M. SIKORA, *Assistant Examiners*.

UNITED STATES PATENT OFFICE
CERTIFICATE OF CORRECTION

Patent No. 3,277,115                         October 4, 1966

Karoly Szabo et al.

It is hereby certified that error appears in the above numbered patent requiring correction and that the said Letters Patent should read as corrected below.

Column 2, lines 29 to 31, the formula should appear as shown below instead of as in the patent:

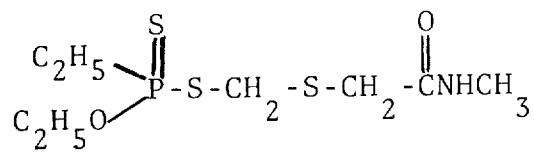

Signed and sealed this 5th day of September 1967.

(SEAL)
Attest:

ERNEST W. SWIDER
Attesting Officer

EDWARD J. BRENNER
Commissioner of Patents